J. C. Hurd.
Cotton Picker.

N°. 10,803.

Patented Apr. 18, 1854.

J. C. Hurd.
Cotton Picker.

No 10,803.  Patented Apr. 18, 1854.

Sheet 2-2 Sheets.

UNITED STATES PATENT OFFICE.

JULIUS C. HURD, OF MEDWAY, MASSACHUSETTS.

CLEANING COTTON AND OTHER FIBROUS SUBSTANCES.

Specification of Letters Patent No. 10,803, dated April 18, 1854.

*To all whom it may concern:*

Be it known that I, JULIUS C. HURD, of Medway, in the county of Norfolk and State of Massachusetts, have invented a new and useful machine for picking, seeding, burring, and cleaning either wool or cotton, as well as for picking and reducing threads composed of either wool, cotton, flax, silk, hemp, or jute or for picking up cloths or any fabric composed of coarse threads and reducing them with the least possible injury to the staple, so that the same may be again carded and spun; and I hereby declare the following to be a full, clear, and exact description of the same, reference being had to the annexed drawings, making part of this specification, in which—

Figure 3:
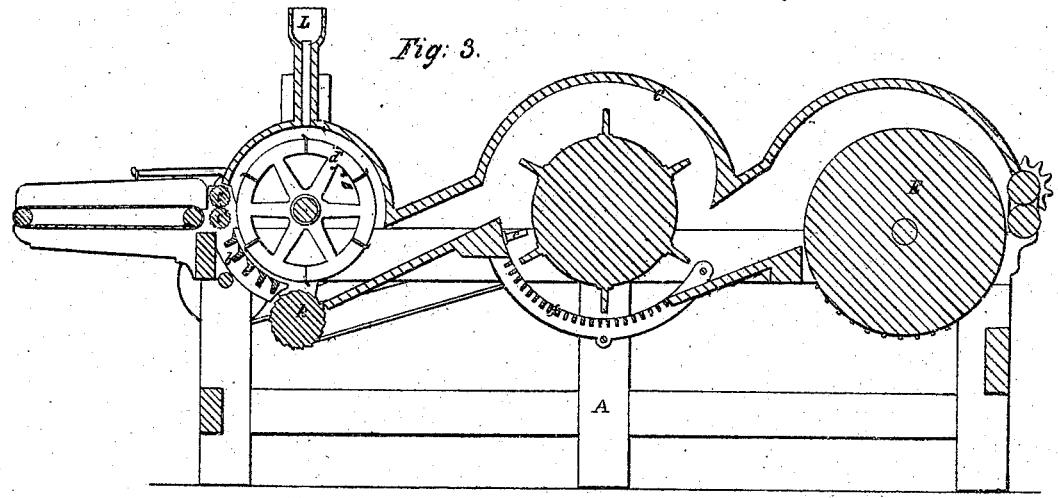
Figure 2:
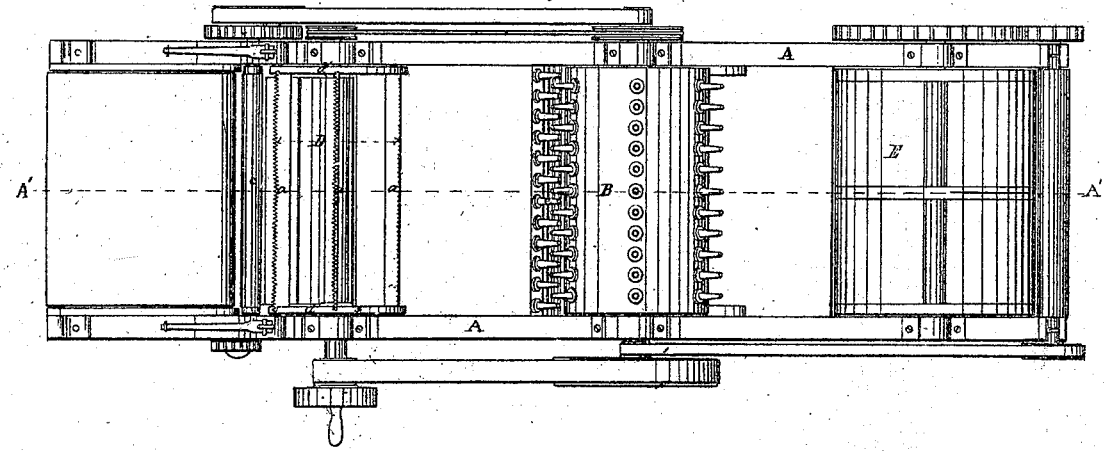
Figure 1:
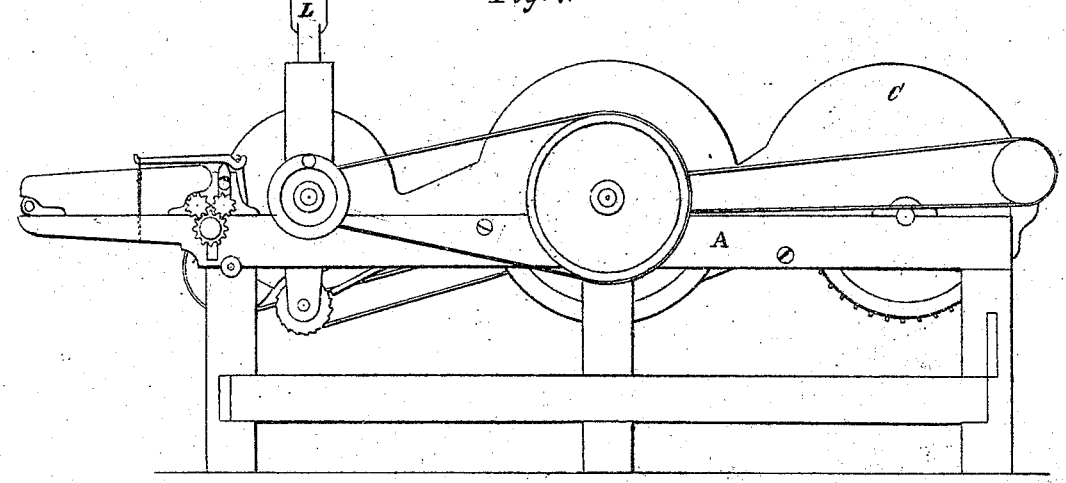
Figure 4:
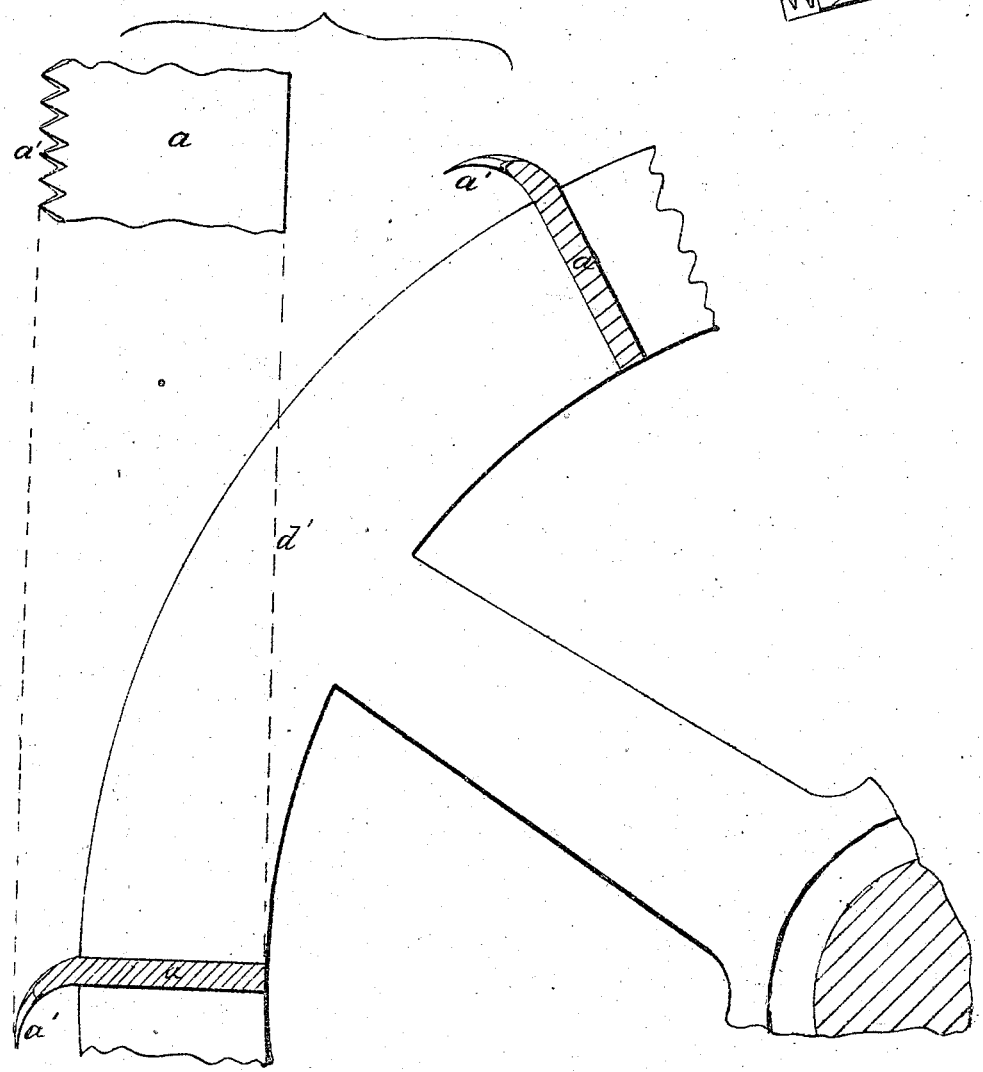
Figure 5:
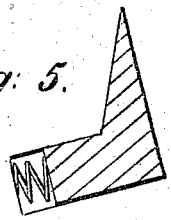

Figure 1 is a side view of my machine with the improvements attached. Fig. 2 is a plan of the same. Fig. 3 is a section on the line A′, A′ of Fig. 2. Fig. 4 is a full sized view of a portion of the combing beater, showing the form of the tooth. Fig. 5, a section through one of the bars of the grating beneath the combing beaters showing the springs upon which the bars rest.

My machine differs in several respects from all others heretofore in use. The picker is composed of two or more heads fastened upon a steel or iron shaft, to which heads the beaters are attached, or a suitable number of arms may be fastened upon the shaft to receive them; these beaters differ essentially from those commonly in use, being furnished with teeth of a peculiar form upon their front edge, of a size adapted to the work which they are to perform; these teeth are concave upon their under side and convex upon the outer surface, and as they are brought into contact with the material, they open or comb it out, and straighten out the fibers, which are thus far less liable to be injured than where they are struck by the ordinary beaters as heretofore constructed.

The grating is set upon spiral or other springs which enables them to act in a manner something similar to a guard, and to remove effectually the burs, seeds and motes, without injury to the staple, while the springs move with sufficient ease to prevent the grating or beaters from being broken should any hard substance be accidentally introduced. The material having been loosened and separated by the action of this combing beater, is then thrown upon a willow cylinder, the pins of which passing through stationary pins in the grating, whip out the finer particles of dust in a manner far superior to what can be effected when the raw material is subjected in bunches as it comes from the bale to the action of the whipper. The material is then blown upon a wire cylinder from which it is separated and taken off by rolls, or it is thrown out upon the floor of the mill as desired.

The revolution of the combing beater produces, like all other revolving fans, a great current centrifugally. This current is ordinarily supplied from the room in which the picker works, and as the weight of the cotton varies with the hygrometric changes of the atmosphere, a variation in the weight of the numbers of the yarn is the result. To obviate this difficulty I introduce from a furnace chamber in the vicinity of the picker, a current of air heated to 90° Fahr. or upward for the purpose of drying the cotton uniformly as it passes through the machine. A further result of this operation is that the cotton is more thoroughly and regularly dusted and cleaned when it is thus uniformly dried, than when it is sometimes damp and sometimes dry.

To enable others skilled in the art to understand and apply my improvements I will proceed to describe their nature and operation.

A is the frame work of the machine; B, the ordinary willow cylinder.

The various parts of the machine are set in motion by appropriate contrivances, which need not be here described, as they form no part of my invention.

C is the boxing or covering within which the operating parts of the machine are inclosed.

D is a cylinder consisting of two heads *d*, *d′*, united and connected together near their periphery by plates of steel *a;* these plates are furnished upon their outer edges with teeth of the form represented at *a'*, Fig. 4; the teeth being cut from the bar itself, and not inserted therein as has heretofore been the case in machines of this character, they are also flat and broad at the base, where they meet the straight portion of the heater, and are so curved as to lie nearly in the surface of the cylinder generated by the revolution of their points. The object of this peculiar construction is as follows: Heretofore where teeth have been employed in the beaters of picking cylinders, they have been long, round, pointed wire teeth, nearly as distant from each other at the base as they are at the point, and in consequence the beater or blade which holds the teeth was thrown to such a distance from the feed rollers, that it entirely lost its character as a beater or blower, while the smaller motes and extraneous matters pass between the teeth, and are not combed out; in my machine, owing to the peculiar curve of the tooth the beater is brought immediately up to the feed roller, and has all the useful properties of an ordinary beater, while the teeth cause its action upon the fibers to be far more gentle, than in the latter case; also owing to the fact that they are made to unite with each other at the base like the teeth of a saw the motes and smaller impurities, slide up to the point of intersection of the bases of the teeth, where they are inevitably combed out, this cannot take place where pointed wire teeth are made use of, in which case all impurities of a size less than the distance of the teeth from each other are not separated from the fibers. When the machine is operating upon cotton, the fibers being loosened and separated from the bunches are blown by the action of the blades *a*, against the willowing cylinder B, by which it is beaten as usual against the stationary pins *e*, and grating *f*, and again blown upon the wire cylinder E from which it is taken upon rolls, or it may be thrown upon the floor of the picker room in the ordinary manner.

*h*, Figs. 3 and 5, are the spiral or other springs, beneath the ends of the slats under the picking cylinder D, each slat having independent springs by which arrangement, as the impurities and motes fall upon the grating after being separated by the combing beaters they are instantly driven out between the slats, by the revolving beaters, and they are thus prevented from being carried around by the cylinder, and again entangled with the material. Furthermore should coarser impurities be introduced with the material they are in like manner discarded from the machine, before the latter has been injured thereby.

*k* is a revolving guard having a surface revolution in a direction contrary to that of the combing beaters, or it may have a surface revolution in the same direction with them but much faster,—the object of this guard is to remove any motes, seeds or burs, which may have escaped the action of the spring grating.

For the purpose of introducing the heated air to the machine I adopt the following plan: The air of a room of suitable size near to the picker, is heated to a temperature of 90° or upward, and from this chamber a pipe L is passed to the casing around the operating parts of the machine as seen in Figs. 1 and 3. The blades of the combing cylinder D operating like a fan, the heated air is drawn in and blown with the material through the wire cylinder.

The advantages which my machine possesses over all others heretofore in use, for performing the first operation in the treatment of cotton, are many. The principal of these however are: First, the staple is far less injured than it is in those machines in which the material is submitted immediately to the action of flat beaters as heretofore constructed. Secondly, the cotton is much more thoroughly cleaned and dusted than when it is passed through the machine in bunches. Thirdly, it is found that a machine of this character is capable of operating upon a much greater quantity of material than the old machines in a given space of time. Besides opening and picking raw material, the machine as above described, is furthermore most perfectly adapted to the performance of other operations, such as tearing to pieces old woolen rags, and even ropes, where the material of the same is required to be respun, or for other purposes. In all these cases the peculiar form of the teeth of my picking cylinder is essential to the perfect operation of the machine.

I do not claim the use of teeth made of pointed wire and secured to the beaters of cotton pickers. Neither do I claim the application of springs to the concave of machines for operating upon fibrous materials; but What I do claim as my invention and desire to secure by Letters Patent in machines for picking cotton and other fibrous materials, is—

1. The use of the peculiar combing beater herein described the teeth being so curved as to bring the beater very near to the feed rollers, and united with each other at their bases in the manner of saw teeth for the purpose set forth.

2. I claim the peculiar method herein described of applying springs to the slats of the grating beneath the beaters, each slat being furnished with independent springs, whereby the motes as they fall upon the grating are instantly knocked through the spaces between the slats and are not carried around by the beater to be again entangled with the material, the slats yielding to permit the impurities to pass between them.

3. I claim the introduction of heated air into machines for picking and dusting cotton, by which a greater uniformity of the numbers of the yarn is obtained, and the material is more thoroughly and readily cleaned.

In testimony whereof I have hereunto set my signature this 13 day of April 1853.

JULIUS C. HURD.

Witnesses:
  SAM COOPER,
  H. B. SPINNEY.